United States Patent Office 3,734,966
Patented May 22, 1973

3,734,966
HYDROFLUORENE DICARBOXYLIC ACID DERIVATIVES AND PROCESS FOR PREPARING THE SAME
Akira Tahara, Asaka, Yasuo Ohtsuka and Tadashi Nakata, Tokyo, and Shoichi Takada, Kawaguchi, Japan, assignors to Rikagaku Kenkyusho, Saitama-ken, Japan
No Drawing. Filed June 25, 1971, Ser. No. 157,021
Claims priority, application Japan, June 30, 1970, 45/57,191; Oct. 2, 1970, 45/86,532; Nov. 28, 1970, 45/105,138; Mar. 29, 1971, 46/18,621; Mar. 29, 1971, 46/18,622
Int. Cl. C07c 63/48
U.S. Cl. 260—515 P          8 Claims

ABSTRACT OF THE DISCLOSURE

Novel chemical compound of 4β,10α - dimethyl - 1,2,3,4,5β,10-hexahydrofluorene - 4α,6α - dicarboxylic acid and alkali salts thereof which are useful as a new synthetic sweetening agent and a potential intermediate in the synthesis of gibberellin $A_{12}$ or its related substances.

Said compounds can be synthesized via 4β,10α-dimethyl-1,2,3,4,5α,10-hexahydro - 6β - hydroxyfluoroene-4α,6α-dicarboxylic acid dervied from disproportionated rosin containing dehydroabietic acid.

The present invention relates to new 4β,10α-dimethyl-1,2,3,4,5β,10-hexahydrofluoroene-4α,6α-dicarboxylic acid having the structural formula:

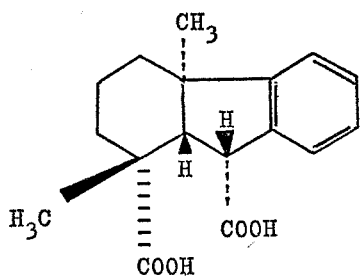

and new alkali salts of 4β,10α - dimethyl - 1,2,3,4,5β,10-hexadhydrofluorene - 4α,6α - dicarboxylic acid having the formula:

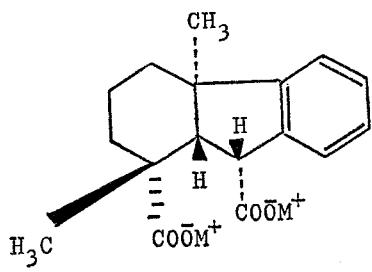

wherein each M represents Na⁺, K⁺, Ca⁺⁺/2, NH₄⁺, Al⁺⁺⁺/3 or only one of M represents an alkali metal or an alkaline earth metal to give a half salt, which are derived from a resin acid (1-abietic acid) contained as a main component in rosin obtained in a large amount from conifers, and a quite advantageous process for preparing these new compounds.

A predominant utility of the compounds of the present invention is that they provide intermediates from which gibberellins known as plant growth regulators or their related substances are synthesized.

Gibberellins are metabolic products of Gibberella fujikuroi and they have been used widely as agricultural chemicals in virtue of their specific plant-growing action.

Among the gibberellins, for example, gibberellin $A_{12}$ is a dibasic acid of $C_{20}H_{28}O_4$, i.e. 1α-10ε-dicarboxy-1β, 4aα - dimethyl - 8 - methylene - gibban of the following formula:

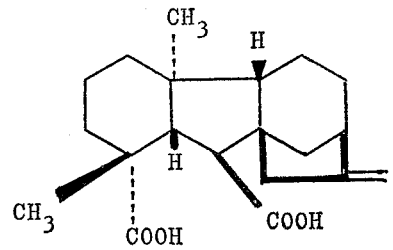

(B. E. Cross and K. Norton: J. Chem. Soc., 1570 (1965)).

The compound of the present invention, i.e. 4β,10α-dimethyl - 1,2,3,4,5β,10 - hexahydrofluorene - 4α,6α-dicarboyxlic acid has a structure very close to the nucleus of the above mentioned structure of gibberellin $A_{12}$, and it can be used as a potential intermediate in the synthesis of gibberellin $A_{12}$ or its related substances. Thus, the use of the compound is much expected.

Further, gibberellin $A_{12}$ is a mother nucleus for the other gibberellin group ($C_{19}$ compounds) and it can be used as intermediate in the biosynthesis of gibberellic acid having the following formula:

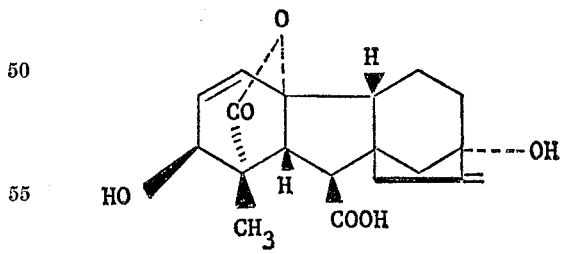

Second, it has been found that the compounds of the present invention have very strong sweetness, though they contain no nitrogen as a constituent, while all conventional artificial sweetenings have been nitrogen-containing compounds, and strength of their sweetness has been confirmed in a panel test as given below. Thus, the compounds are very useful as new synthetic sweetenings.

The process of the present invention will be described below in detail.

Up to the present, steps shown by the following reaction formulae (1)–(10) have been known as a process for deriving 4β,10α-dimethyl-1,2,3,10-tetrahydrofluorene-4α,6-dicarboxylic acid anhydride having the following structure (10) from a resin acid (1) contained as a main component in rosin obtained in a large amount from conifers.

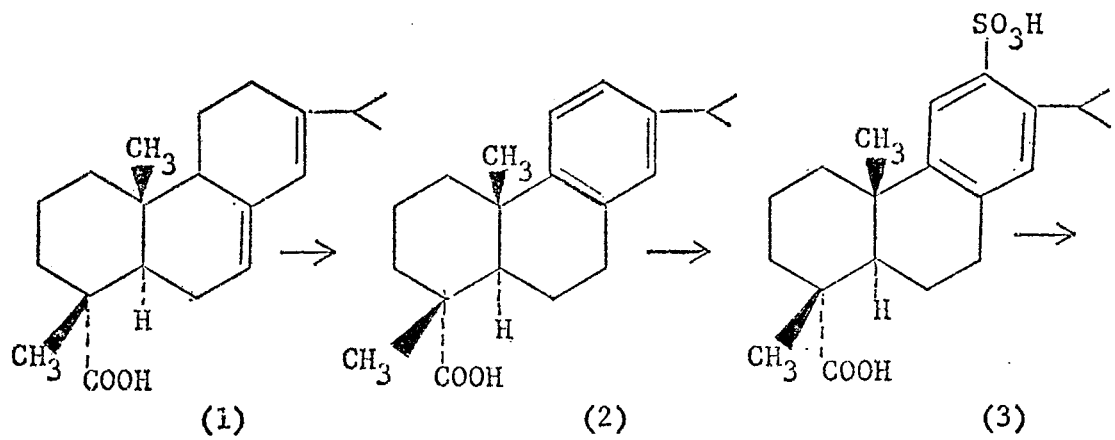

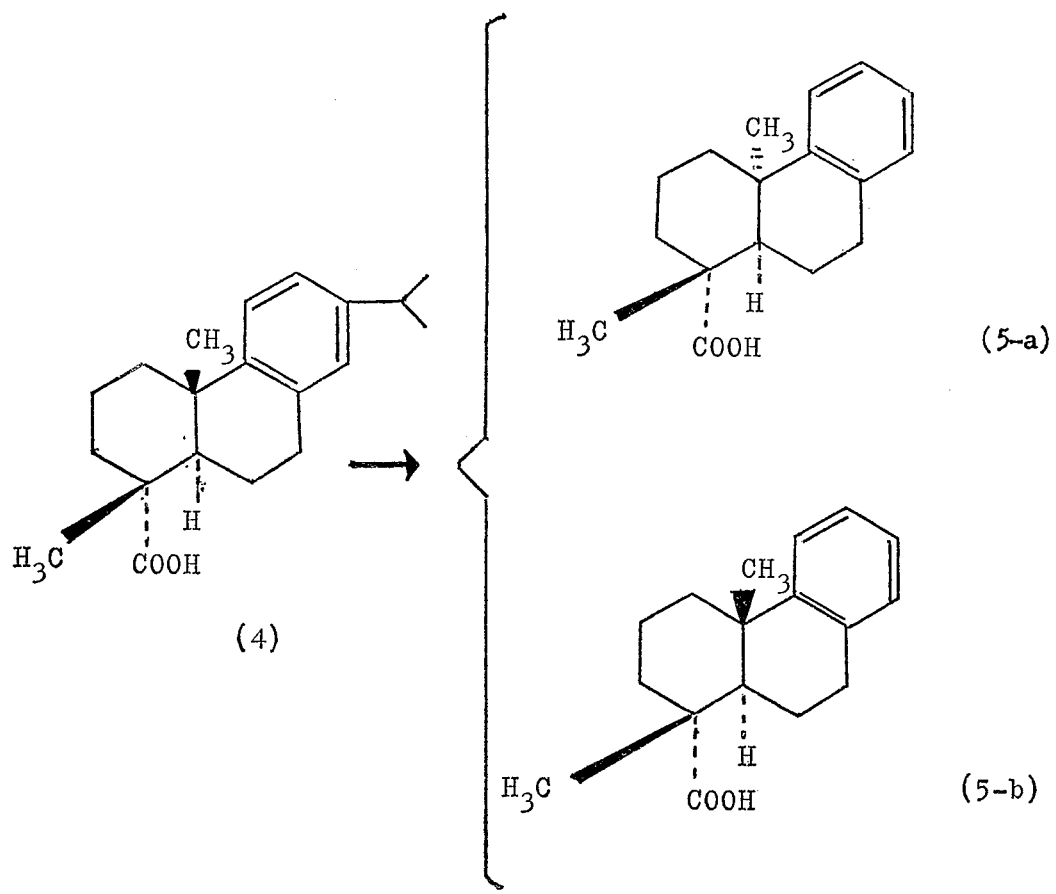

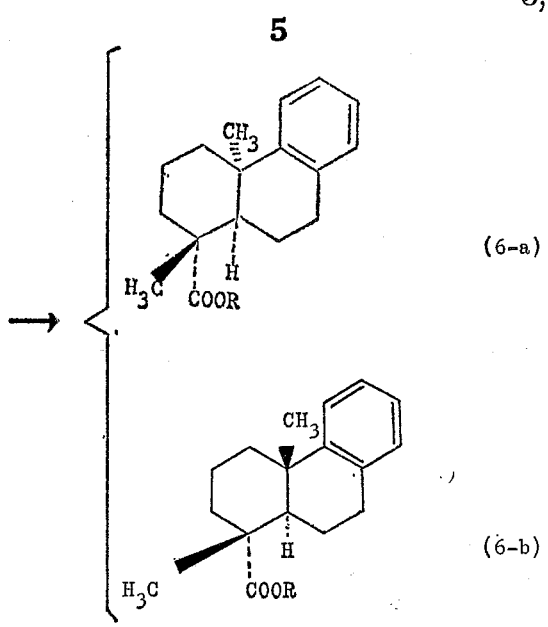

(6-a)

(6-b)

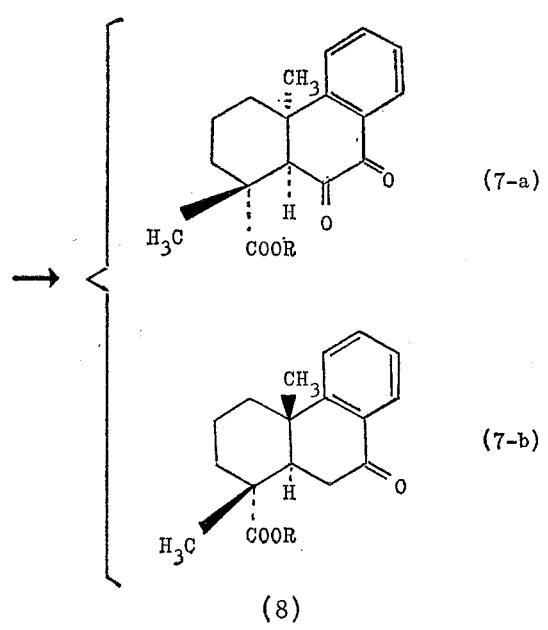

(7-a)

(7-b)

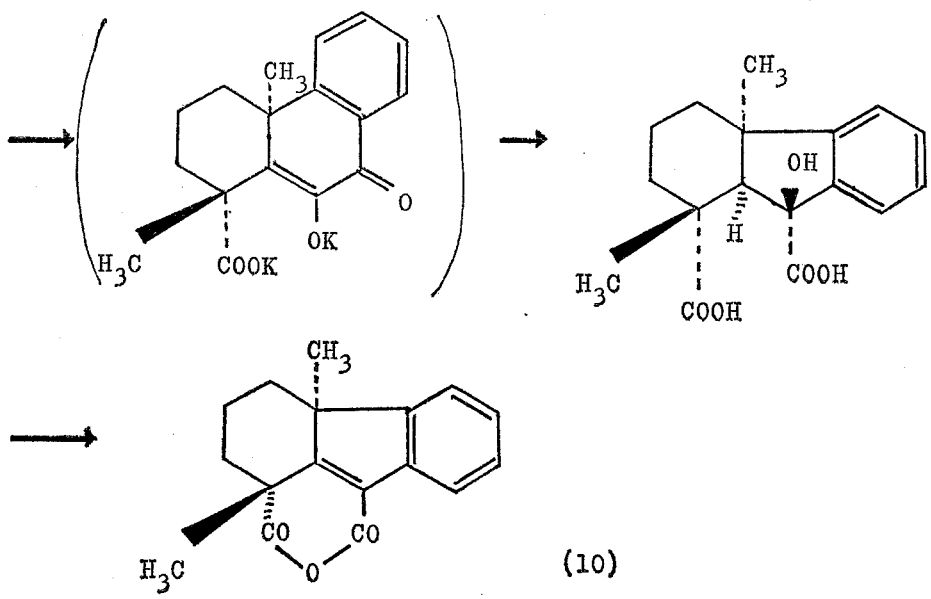

In the above steps (1)–(10), the resin acid (1) is subjected to dehydrogenation reaction in the presence of palladium/carbon to form dehydroabietic acid (2), which is then purified through (i) sulfonation with concentrated sulfuric acid into sulfodehydroabietic acid (3), which is subjected to recrystallization and purification and finally (ii) desulfonation to obtain pure compound (4) i.e., purified Compound (2).

Compound (4) is reacted with anhydrous aluminum chloride in benzole to obtain two stereoisomers, i.e. desisopropylallodehydroabietic acid (5-a) and desisopropyl group, which products are then esterified to obtain mixture of a desisopropylallodehydroabietic acid alky ester (6-a) and a desisopropyldehydroabietic acid alkyl ester (6-b).

The Compounds (6-a) and (6-b) are oxidized into an alkyl - 6,7-dioxo-5α-enantiopodocarpa-8,11,13-triene-16 - oate (7-a) and an alkyl - 7 - oxo desisopropyldehydroabietate (7-b), respectively.

Thereafter, Compound (7-a) is taken out by recrystallization and subjected to benzilic acid rearrangement with an alkali after conversion into the enol form, Compound (8) to obtain 4β,10α - dimethyl - 1,2,3,4,5α,10-hexahydro - 6β - hydroxyfluorene - 4α,6α-dicarboxylic acid (9). The product is then converted into 4β,10α-dimethyl - 1,2,3,10 - tetrahydrofluorene - 4α,6 - dicarboxylic acid anhydride (10) with acetic anhydride. (M. Ohta, L. Ohmori: Chem. & Pharm. Bull. (Tokyo), vol. 5, 91 (1957), Tahara: Chem. Pharm. Bull. (Tokyo), vol. 9, 252 (1961) and grove, et al.: J. Chem. Soc. 1105 (1961)).

The inventors have found a process for synthesizing 4β,10α - dimethyl - 1,2,3,4,5β,10 - hexahydrofluorene-4α,6α - dicarboxylic acid (14) from the above Compound (10) by the following steps shown by reaction Formulae (10)–(14).

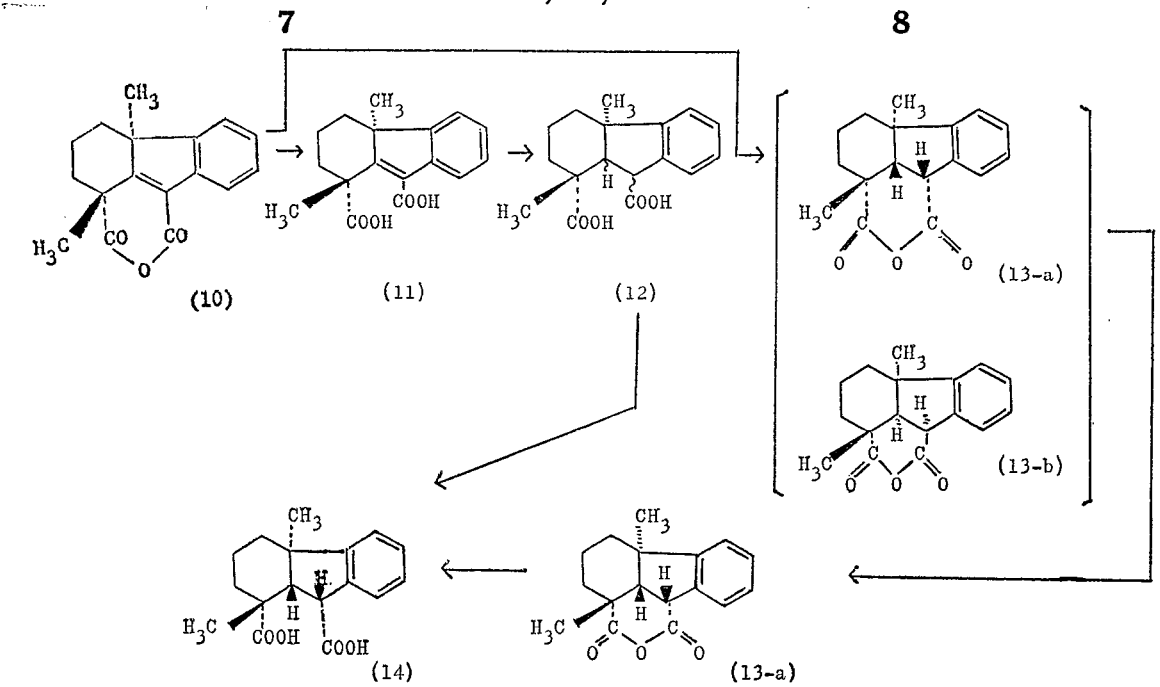

The above Compound (10) is reacted with alkali to obtain 4β,10α - dimethyl - 1,2,3,10 - tetrahydrofluorene-4α,6-dicarboxylic acid (11), which is then catalytically reduced to obtain 4β,10α - dimethyl - 1,2,3,4,5α,10-hexahydrofluorene - 4α,6β - dicarboxylic acid and 4β,10α-dimethyl - 1,2,3,4,5β,10 - hexahydrofluorene - 4α,6α-dicarboxylic acid (12) and the mixture is recrystallized from mixed ether/petroleum ether to obtain 4β,10α - dimethyl - 1,2,3,4,5β,10 - hexahydrofluorene - 4α,6α-dicarboxylic acid (14). On the other hand, said Compound (14) can be obtained also by catalytically reducing the above Compound (10) in acetic anhydride into the mixture of Compound (13-a) and Compound (13-b), recrystallizing the mixture from ether/petroleum ether to obtain Compound (13-a) and finally hydrolyzing the compound in aqueous alkali hydroxide solution, or said Compound (14) can be obtained directly by catalytically reducing Compound (10) and alkali-hydrolyzing the resulting mixture of Compound (13-a) and (13-b) into Compound (14).

However, in the step of synthesizing Compound (9) in the above reaction steps, a large quantity of sulfuric acid is required for obtaining said Compound (4) by purification. For example, 1500 kg. of sulfuric acid are necessitated in the treatment of 20 kg. of disproportionated rosin (containing said dehydroabietic acid), and this procedure is economically quite disadvantageous. In those steps, procedures are quite complicated and a considerable period of time is required to give only a very low yield of Compound (9) of 3.7% based on the disproportionated rosin. Thus, said process is not preferred from industrial point of view.

After intensive investigations on an advantageous process for synthesizing hydrofluorene dicarboxylic acid derivatives, the inventors have found a process for synthesizing the aimed 4β,10α - dimethyl - 1,2,3,4,5β,10-hexahydrofluorene - 4α,6α - dicarboxylic acid and alkali salts thereof. The present invention has been accomplished on the basis of this finding.

The reaction steps in the process for the present invention are as follows:

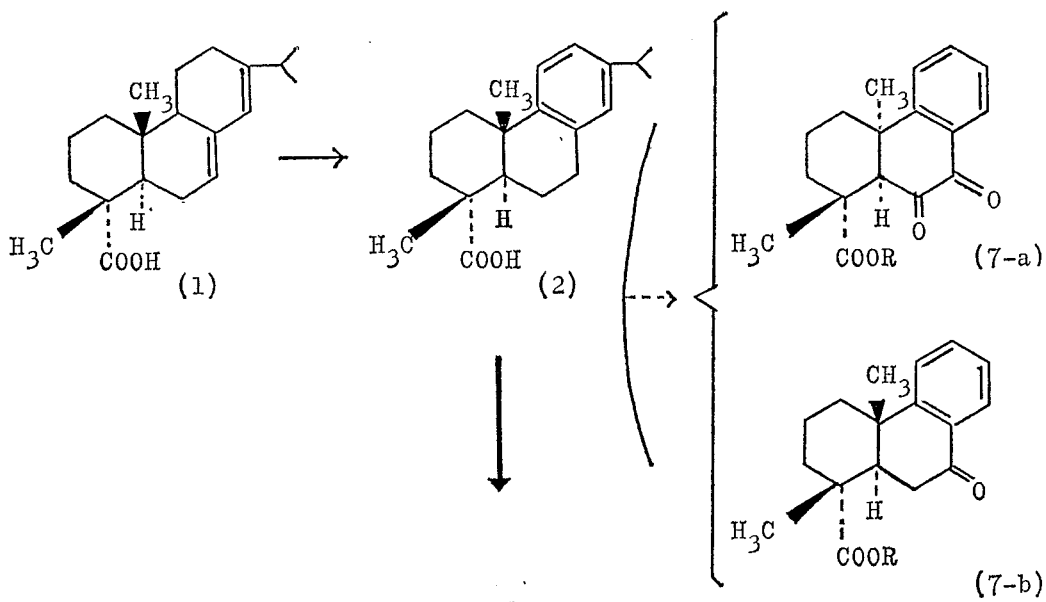

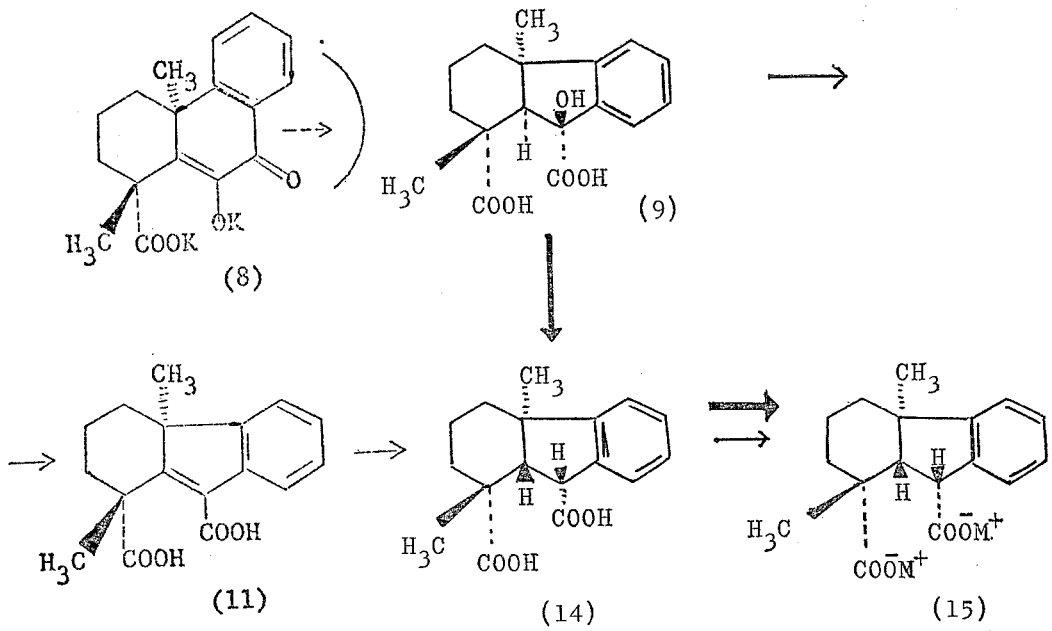

The practical synthesizing process of the present invention will be illustrated below.

Disproportionated rosin (containing dehydroabietic acid) obtained by dehydrogenation of resin acid (1) in the presence of palladium/carbon is dissolved in 6–10 times quantity of benzole without purification and about 10% of the used benzole is distilled out for the purpose of dehydration. The dehydration condition sufficient for being used in the reaction is judged by disappearance of turbidity from the distilled benzole. Thereafter, a suitable quantity of anhydrous aluminum chloride is added under stirring. Quantity of anhydrous aluminum chloride must be varied somewhat depending upon contents of dehydroabietic acid in the disproportionated rosin. In case of disproportionated rosin having 40–50% of dehydroabietic acid content, most preferred quantity of anhydrous aluminum chloride is ⅔ (by weight) of the disproportionated rosin.

The reaction is carried out at room temperature (around 25° C.) for 4–5 hours. After completion of the reaction, the reaction mixture is separated into benzole and aqueous layers by adding hydrochloric acid and then water under cooling with water. The benzole layer is isolated from the aqueous layer, washed with dilute aqueous hydrochloric acid solution and then thoroughly with water. The benzole layer, without being dried, is subjected to distillation to distill out ⅔ of the total benzole, added with a small quantity of pyridine, heated and added with thionyl chloride dropwise to effect the reaction. After completion of the addition, the reaction mixture is heated under reflux, cooled, added with methanol and again heated under reflux.

After completion of the reaction, benzole and excessive methanol are removed thoroughly by concentration under reduced pressure and the concentrated residue is dissolved in acetic acid. The solution thus obtained is heated to keep at about 60° C. and added with chromic anhydride dissolved in 80% aqueous acetic acid solution. Thereafter, the reaction is performed at about 60° C. and the reaction mixture is added with methanol and allowed to stand overnight to decompose excessive chromic acid. The reaction solution is concentrated as far as possible and the residue is added with water. By extracting with benzole, benzole extract of said Compounds (7–a) and (7–b) is obtained. The benzole layer is washed thoroughly with water, washed with aqueous sodium carbonate solution, and again with water, and concentrated under reduced pressure to remove benzole. The concentrated residue is stirred together with 20% aqueous KOH solution and insoluble matters are removed by extraction with benzole. In the resulting aqueous potassium hydroxide solution, said Compound (7–a) is contained in the form of Compound (8).

The aqueous potassium hydroxide solution is heated under reflux, cooled and acidified with a mineral acid under cooling with water to precipitate the crystal. Thus, resulting crystal is filtered, washed with water, dried and then dissolved in ethyl acetate. Insoluble matters are removed by filtration and the solution is concentrated, from which ethyl acetate is distilled out. The resulting viscous residue is subjected to repeated extraction under heating with mixed solvent of water and methanol (2:1). The extraction solution is cooled to obtain white crystal. By recrystallization of the crystal, pure Compound (9), i.e. 4β,10α-dimethyl-1,2,3,4,5α,10 - hexahydro - 6β - hydroxyfluorene-4α,6α-dicarboxylic acid is obtained.

Then, the resulting Compound (9) is added into acetic acid which has been purified by distillation, and the mixture is added with a small quantity of concentrated sulfuric acid and heated under reflux. The reaction solution is cooled to room temperature and catalytically reduced in the presence of a catalyst such as palladium/carbon or platinum oxide, from which the catalyst is then removed and then acetic acid is removed to precipitate white prismatic crystal. The crystal is obtained by filtration and washed with ether. The combined mother liquor and ether layer are further concentrated to precipitate again crystal, which is separated by filtration. Analysis proves that the resulting crystal is the very Compound (14), i.e. 4β,10α-dimethyl-1,2,3,4,5β,10-hexahydrofluoroene - 4α,6α - dicarboxylic acid.

Further, another process can be employed wherein the above reaction solution is concentrated to remove acetic acid and then added with water to precipitate crystal, which is taken out and recrystallized from water/methanol to obtain said Compound (11), which is then reduced catalytically.

Said Compound (14) is neutralized and thereby dissolved by being added into 2 equivalents (per mole) of an aqueous alkali solution and the resulting solution is concentrated under reduced pressure at a low temperature and then added with acetone to obtain the final Compound (15) of the present invention, i.e. 4β,10α-dimethyl-1,2,3,4,5β,10-hexahydrofluorene-4α,6α-dicarboxylic acid alkali salt as white, needle-like crystal.

According to the process of the present invention, as described above in detail, pure Compound (9) can be prepared in a simple manner in a good yield of about 25 times yield of the conventional process from disproportionated rosin containing dehydroabietic acid (obtained by dehydrogenation of resin acid (1) in the presence of palladium/carbon) by continuous reactions without necessitating a step of purifying dehydroabietic acid by publicly known sulfonation reaction. Further, from Compound (9), Compound (11) is obtained quantitatively, from which final Compound (15) can be synthesized via Compound (14) by catalytic reduction reaction not necessitating extraction of Compound (11). Thus, the process of the present invention is quite advantageous from industrial viewpoint.

The process of the present invention will be illustrated below by way of examples.

EXAMPLE 1

20 kilograms of disproportionated rosin (containing 40–50% of dehydroabietic acid) are dissolved in 130 liters of benzole and then the solution is heated to distill out 30 liters of benzole. Under stirring, 13.4 kg. of anhydrous aluminum hydroxide powder are added to the solution at room temperature (25° C.) and the whole is stirred for additional 4.5 hours.

After completion of the reaction, the reaction mixture is cooled with water to 18° C. and then added with 47 kg. of concentrated hydrochloric acid little by little over one hour. After stirring a while, 40 liters of water are added therein whereby the mixture is separated into benzole layer and aqueous layer. The benzole layer is taken and washed with 75 liters of 10% aqueous hydrochloric acid solution and then twice with 60 liters of water. Thereafter, 50 liters of benzole are distilled out under reduced pressure.

The remaining benzole solution is added with 1.5 kg. of pyridine, which is then added with 24 kg. of thionyl chloride dropwise under heating to 40° C. The reaction proceeds with violent evolution of hydrogen chloride gas. Upon completion of the addition of thionyl chloride, temperature is raised slowly and reflux is effected for one hour. The reaction mixture is cooled with water to 18–20° C. and then added with 60 liters of methanol. The temperature is raised slowly and reflux is effected for 1.5 hours to carry out the reaction. After completion of the reaction, benzole and excessive methanol are distilled out completely under reduced pressure. The resulting sirupy residue is added with 60 liters of acetic acid and then added dropwise with chromic acid solution obtained by dissolving 22 kg. of chromic acid anhydride in 100 liters of 80% aqueous acetic acid solution, while temperature is kept at 60° C. by heating. After completion of the addition, the stirring is continued at 60° C. for 4 hours and the mixture is added with 50 liters of methanol and allowed to stand overnight. Methanol and acetic acid are distilled out under reduced pressure and the mixture is stirred for 15 minutes together with 100 liters of water.

The product is extracted three times with 50 liters of benzole and the benzole extract is washed three times with 50 liters of water, then two times with 50 liters of 10% sodium carbonate solution and finally with 50 liters of water. Extraction was effected three times with 50 liters of 20% KOH solution and the resulting potassium hydroxide solution (150 liters) is boiled for 20 hours. After completion of the reaction, the mixture is added with 50 kg. of concentrated hydrochloric acid to adjust pH to 3.0 under cooling with water, whereby crystal is precipitated. The crystal is taken out by centrifugation and dried with hot air at 60° C. Yield: 3.2 kg.

The dried crystal is dissolved in 20 liters of ethyl acetate. The insoluble matters are removed by filtration. The solution is then concentrated to distill out ethyl acetate. The residue is hot-extracted three times with 10 liters of mixed solvent of water/methanol (2:1). By cooling the extract, crystal is precipitated. The crystal is collected by filtration and recrystallized from 5 liters of methanol. Yield: 1.5 kg.

Analysis proves that the resulting crystal is said Compound (9), i.e. 4β,10α-dimethyl-1,2,3,4,5α,10-hexahydro-6β-hydroxyfluorene-4α,6α-dicarboxylic acid.

Physical properties of Compound (9) are as follows:

Melting point: 131–134° C.

Specific rotatory power: $[\alpha]_D^{8.5}$—32.0 (EtOH)

*Elementary analysis.*—(as $C_{17}H_{20}O_5 \cdot H_2O$) Theoretical (percent): C, 63.34; H, 6.88. Found (percent): C, 63.45; H, 7.11.

Infrared absorption spectrum: (Characteristic absorption) $\nu_{max.}^{KBr}$ 1710 cm.$^{-1}$ (COOH)

EXAMPLE 2

Compound (9) obtained in Example 1 (2.0) kg.) is dissolved in 50 liters of acetic acid which has been purified by distillation, and the solution is heated under reflux under stirring for 2 hours together with 50 cc. of concentrated sulfuric acid. After completion of the reaction, the reaction mixture is cooled to room temperature (around 25° C.) and resulting small amount of insoluble matters are removed by filtration. Then, 700 g. of 10% palladium/carbon catalyst are added therein to effect catalytic reduction. This reaction is effected at room temperature (around 25° C.) for 70–80 hours, and about 144 liters of hydrogen are absorbed. After completion of the reduction, the catalyst is removed by filtration and the filtrate is concentrated under reduced pressure till quantity of acetic acid is reduced to 5 liters to precipitate white crystal. The crystal is taken out by filtration and the mother liquor is concentrated to 500 cc. to precipitate crystal. The crystal is collected and washed with ether to obtain pure Compound (14), i.e. 4β,10α-dimethyl-1,2,3,4,5β,10-hexahydrofluorene-4α,6α-dicarboxylic acid. Yield: 820 g.

820 grams of Compound (14) thus obtained are dissolved in 4.518 liters of 5% aqueous sodium hydroxide solution under stirring. pH becomes 9.0. The resulting solution is concentrated at 50° C. under reduced pressure into a sirupy state, which is then added with 20 liters of acetone to obtain Compound (15), i.e. 4β,10α-dimethyl-1,2,3,4,5β,10-hexahydrofluorene - 4α,6α - dicarboxylic acid disodium salt as white, needle-like crystal. Yield: 935 g.

Physical properties of Compound (15) are as follows:

Melting point: 296–299° C.

Solubilities: Soluble in water, difficultly soluble in methanol and ethanol, and insoluble in acetone.

Thermal stability:

(Condition 1)

Two milliliters of water are added into 2 ml. of 1,000 fold-diluted solution of the said disodium salt and the mixture is heated in water bath at 80° C. for 6 hours. The mixture becomes sweet. After completion of the reaction, the mixture is acidified with HCl and extracted with ether. The solvent is distilled out and the product is esterified with diazomethane. No change is observed in gas-liquid chromotography (G.L.C.) measurement.

(Condition 2)

Two milliliters of water are added into 2 ml. of 1,000 fold-diluted solution of the said disodium salt and the mixture is refluxed in oil bath at 130° C. for 8 hours. The mixture becomes sweet. After treatment in the same manner as above Condition 1, change is observed in G.L.C. measurement (OV-17, 200° C.). According to G.L.C., the peak area ratio is:

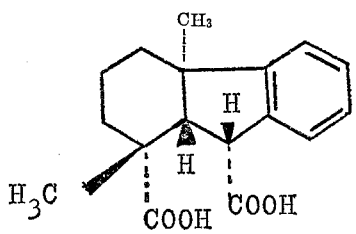 : 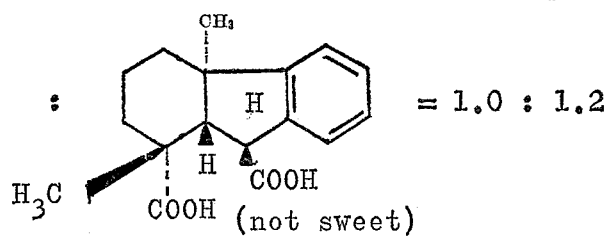 = 1.0 : 1.2 (not sweet)

(Condition 3)

Nine milliliters of dilute acetic acid solution (pH 5.0) are added into 2 ml. of 1,000 fold-diluted solution of the said disodium salt and the mixture is refluxed in oil bath at 130° C. for 8 hours. The mixture becomes sweet. After treatment in the same manner as in Condition 1, no change is observed in G.L.C. measurement.

(Condition 4)

Nine milliliters of aqueous citric acid solution (pH 3) are added into 2 ml. of 1,000 fold-diluted solution of the said disodium salt and the mixture is refluxed in oil bath at 130° C. for 8 hours. The mixture becomes sweet. After treatment in the same manner as in Condition 1, no change is observed in G.L.C. measurement.

EXAMPLE 3

Potassium, ammonium and calcium salts of the final Compound (15) are obtained from Compound (9) obtained in Example 1 in the same manner as in Example 2 except that, in place of 4.518 liters of 5% aqueous sodium hydroxide solution, 6.39 liters of 5% potassium hydroxide solution, 4.32 liters of 5% aqueous ammonium solution and 4.22 liters of 5% hydrated calcium hydroxide solution, respectively, are used. Yield are 1,020 g., 910 g. and 925 g., respectively Physical properties of the above potassium, ammonium and calcium salts are as follows:

(Potassium salt)

Melting point: 281–284° C.
Solubilities: Soluble in water, difficultly soluble in methanol and ethanol, and insoluble in acetone.

(Ammonium salt)

Melting point: 241–243° C.
Solubilities: Soluble in water, methanol and ethanol, and insoluble in acetone.

(Calcium salt)

Melting point: above 300° C.
Solubilities: Soluble in water and insoluble in methanol, ethanol and acetone.

EXAMPLE 4

152 grams of Compound (9) obtained in Example 1 are dissolved in 4 liters of acetic acid, into which are then added 4 cc. of concentrated sulfuric acid and the whole is refluxed under heating for 2.5 hours to effect the reaction. The reaction solution is concentrated under reduced pressure to remove acetic acid as far as possible, which is then stirred together with 1 liter of water to precipitate crystal. The crystal is taken out by filtration, washed thoroughly with water and recrystallized from 5% aqueous methanol solution to obtain Compound (11), i.e. 4β,10α-dimethyl-1,2,3,10-tetrahydrofluorene-4α,6 - dicarboxylic acid as white, needle like crystal. Yield: 138.3 g. (96.0%).

Physical properties of Compound (11) are as follows:
Melting point: 210–212° C.
Elementary analysis.—(as $C_{17}H_{18}O_4$): Theoretical (percent): C, 71.3; H, 6.3. Found (percent): C, 71.2; H, 6.3.

Infrared absorption spectrum: $\nu_{max.}^{KBr}$ 1739, 1691 cm.$^{-1}$
(Characteristic absorption) (COOH), 1600 cm.$^{-1}$
(C=C)

In 2.48 liters of acetic acid, 825 g. Compound (11) obtained as above are dissolved, into which are then added 33 g. of 10% palladium/carbon. The mixture is stirred at room temperature (25° C.) under 1 atm. hydrogen for 70 hours to effect hydrogenation. The catalyst is taken out by filtration and the solvent is distilled out under reduced pressure to precipitate crystal. Then, the product is stirred thoroughly together with 500 cc. of ether and the crystal is filtered out, washed with ether, taken out and dried. The crystal is Compound (14), i.e. 4β,10α-dimethyl-1,2,3,4,5β,10-hexahydrofluorene - 4α,6α - dicarboxylic acid. Yield: 437 g. (51.6%).

Physical properties of compound (14) thus obtained are as follows:
Melting point: 222–224° C.
Molecular weight (as $C_{17}H_{20}O_4$):
 Theoretical: 288 1362
 Found: 288 1370

Infrared absorption sqectrum: $\nu_{max.}^{KBr}$ 1714, 1695 cm.$^{-1}$
(Characteristic absorption)

Then, 43.7 g. of Compound (14) are dissolved in 340 cc. of 5% potassium hydroxide solution. pH of the solution is 9.0. Insoluble matters, if found, are removed by filtration. The solution is concentrated into sirupy state and then added with 300 cc. of acetone to precipitate Compound (15), i.e. 4β,10α-dimethyl-1,2,3,4,5β,10-hexahydrofluorene-4α,6α-dicarboxylic acid potassium salt as needle-like crystal.

Compound (15) is taken out by filtration and dried under vacuum to obtain yield of 60 g. (99%).

On the other hand, Compound (14) obtained in Example 4 (820 g.) is dissolved in 2.259 liters of 5% aqueous sodium hydroxide solution, and the resulting solution (pH 6.8) is concentrated at 50° C. under reduced pressure into sirupy state and then crystallized from acetone to obtain 870 g. of monosodium salt of Compound (15).

Physical properties of the monosodium salt thus obtained are as follows:

Melting point: 186–188° C.
Solubilities: Soluble in water and methanol and insoluble in acetone.

Our toxicity tests for the compounds of the present invention, i.e. 4β,10α - dimethyl - 1,2,3,4,5β,10-hexahydrofluorene-4α,6α-dicarboxylic acid and the sodium salt thereof, revealed the following results.

Acute toxicity after peritoneoclysis

Experiment: The subject animals consist of each group of ten female mice (weighing 19–21 g.) of ddy strain.
The compound having the general formula (A):

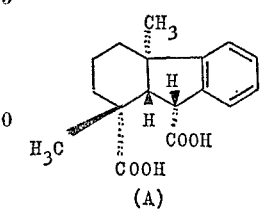
(A)
Sample A

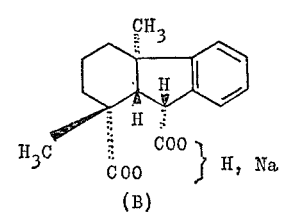
(B)
Sample B i.e. 4β,10α - dimethyl - 1,2,3,4,5β,10-hexahydrofluorene-4α,6α-dicarboxylic acid (hereinafter referred to as "Sample A") is dispersed in 0.5% tween-20, and the compound having the general formula (B), i.e. 4β,10α-dimethyl - 1,2,3,4,5β,10 - hexahydrofluorene-4α,6α-dicarboxylic acid monosodium salt (hereinafter referred to as "Sample B") is dissolved in the physiological salt solution. The obtained liquids were injected in the abdominal cavity with the amount corresponding to each body weight at the rate 10 g./0.1 ml.

Results:

In the tests for the administration of 300 mg./kg. which was determined as the maximum for 0% of mortality in the acute toxicity test, the death number was all of ten for Sample A and two for Sample B. This was the reason why we reduced the dose. Sample B gave no fatal case with 100 mg./kg., while Sample A provided 4 fatal cases with 250 mg./kg., one case with 200 mg./kg. and none with 100 mg./kg.

It was revealed from these results that Sample A presented $LD_{50}$ of 250–300 mg./kg. and Sample B $LD_{50}$ of 300–424 mg./kg.

The following table discloses the time-courses of behavior of these compounds after peritoneoclysis for mice.

Experiment

The selected test materials were Sample B, saccharine sodium (hereinafter referred to as Sac-Na) and sucrose (first grade reagent), which were dissolved and diluted with distilled water in the following dilution series:

| Sample B | | Sac-Na | | Sucrose | |
|---|---|---|---|---|---|
| Sample No. | Concn., mcg./ml. | Sample No. | Conc., mcg./ml. | Sample No. | Concn., mcg./ml. |
| 10 | 100 | 20 | 100 | 30 | 10,000 |
| 11 | 50 | 21 | 50 | 31 | 5,000 |
| 12 | 25 | 22 | 25 | 32 | 2,500 |
| 13 | 12.5 | 23 | 12.5 | 33 | 1,250 |
| 14 | 6.25 | 24 | 6.25 | 34 | 6.25 |
| 15 | 3.125 | 25 | 3.125 | 35 | 312.5 |
| 16 | 1.56 | 26 | 1.56 | 36 | 156 |

Selected ten adult persons (male and female) having normal sense of taste were demanded to mark the sample numbers which gave the sense of sweetness at the listed dilutions, and also to pick up the sample numbers which presented the sense of sweetness equivalent to No. 30 (one percent solution or 10,000 mcg./ml. solution of sucrose).

| Sample | Dose, mg./kg. | 0 | 10 min. | 20 min. | 30 min. | 1 hour | 24 hrs. | 168 hrs. |
|---|---|---|---|---|---|---|---|---|
| A | 100 | 0/10 | 0/10 | 0/10 | 0/10 | 0/10 | 0/10 | 0/10 |
|   | 200 | 0/10 | 0/10 | 1/10 | 1/10 | 1/10 | 1/10 | 1/10 |
|   | 250 | 0/10 | 0/10 | 3/10 | 4/10 | 4/10 | 4/10 | 4/10 |
|   | 300 | 0/10 | 6/10 | 8/10 | 8/10 | 10/10 | 10/10 | 10/10 |
|   | 424 | 0/10 | 8/10 | 10/10 | 10/10 | 10/10 | 10/10 | 10/10 |
| B | 100 | 0/10 | 0/10 | 0/10 | 0/10 | 0/10 | 0/10 | 0/10 |
|   | 300 | 0/10 | 0/10 | 1/10 | 1/10 | 2/10 | 2/10 | 2/10 |
|   | 424 | 0/10 | 2/10 | 7/10 | 7/10 | 10/10 | 10/10 | 10/10 |

The intravenous injection tests presented the results substantially equivalent to the above-mentioned peritoneoclytical tests.

On the other hand, the compound having the formula:

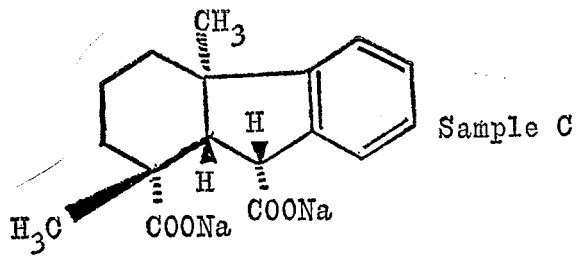

Sample C i.e. 4β,10α - dimethyl - 1,2,3,4,5β,10-hexahydrofluorene-4α,6α-dicarboxylic acid disodium salt (hereinafter referred to as "Sample C") was also tested by peritoneoclysis with the mice (weighing 20 g.) of ddN-strain and by employing the test process similar to that as mentioned in the preceding paragraphs.

The obtained results are described as follows:

♀      ♂
424.1 mg/kg    432.9 mg/kg

Also the intravenous injection and oral administration tests of Sample C presented the results as follows:

|  | ♀ | ♂ |
|---|---|---|
| Intravenous injection: | 460.1 mg/kg | 434.7 mg/kg |
| Oral administration: | 1,314.5 | 1,466.3 |

Next, the sweetness intensity of the compounds of the present invention, i.e. 4β,10α-dimethyl-1,2,3,4,5β,10-hexahydrofluorene-4α,6α-dicarboxylic acid monosodium and disodium salts was measured in comparison with those of sucrose and saccharine, a synthetic sweetening.

(I) 4β,10α-dimethyl-1,2,3,4,5β,10-hexahydrofluorene-4α,6α-dicarboxylic acid monosodium salt (Sample B)

Results

The obtained results are summarized as follows:

| Paneled person | Sample No. presenting minimum sense of sweetness | | Sample No. having the sweetness equivalent to No. 30 | |
|---|---|---|---|---|
| A | 13 | 21 | 30 | 13 | 22 |
| B | 13 | 21 | 30 | 14 | 20 |
| C | 14 | 21 | 30 | 14 | 21 |
| D | 15 | 22 | 30 | 15 | 22 |
| E | 15 | 22 | 30 | 14 | 22 |
| F | 15 | 23 | 31 | 15 | 23 |
| G | 14 | 22 | 30 | 14 | 22 |
| H | 14 | 22 | 30 | 15 | 22 |
| I | 15 | 24 | 31 | 14 | 23 |
| J | 15 | 23 | 31 | 14 | 22 |

See the following table:

Total number of persons is in parenthesis ( )

| No. 13 | (2) | No. 21 | (3) | No. 13 | (1) | No. 20 | (1) |
| No. 14 | (3) | No. 22 | (4) | No. 14 | (6) | No. 21 | (1) |
| No. 15 | (5) | No. 23 | (2) | No. 15 | (3) | No. 22 | (6) |
|  |  | No. 24 | (1) |  |  | No. 23 | (2) |
|  |  | No. 30 | (7) |  |  |  |  |
|  |  | No. 31 | (3) |  |  |  |  |

When the numbers are replaced with respective concentrations and the mean values are calculated, then Sample B: 5.9 mcg./ml. of 0.006% (0.0003–0.0012%)
Sac-Na: 28 mcg./ml. or 0.0028% (0.0006–0.0050%)
Sucrose: 8500 mcg./ml. or 0.85% (0.5–1.0%)

These concentrations just mentioned are the minimum perceivable values of sweetness. Comparing the sweetnesses with sucrose as the standard, the concentration of each sample corresponding to 1% sucrose solution, is Sample B: 6 mcg./ml. or 0.0006%
Sac-Na: 32 mcg./ml. or 0.0032%

When indicated by concentration, the magnitudes of sweetness have the following values:

Sample B: about 1,700 times of sucrose
Sac-Na: about 350 times of sucrose

Then it is revealed that Sample B wold have sweetness 3–4 times as much as Sac-Na has. In summary, the results obtained with Sample B proved that, (1) The minimum concentration of solution for presenting the sense of sweetness is 0.0006%,
(2) Its intensity of sweetness is about 1,700 times of sucrose and about 3 times of Sac-Na, and
(3) It is utilizable as a sweetening by itself.

(II) 4β,10α-dimethyl-1,2,3,4,5β,10-hexahydrofluoroene-4α,6α-dicarboxylic acid disodium salt (Sample C)

Experiment: The selected test materials were Sample C, saccharine sodium, and sucrose (first grade reagent) which were dissolved and diluted with distilled water in the following dilution series:

| Sucrose | | Sample C | | Sac-Na | |
|---|---|---|---|---|---|
| Sample No. | Concn., mcg./ml. | Sample No. | Concn., mcg./ml. | Sample No. | Concn. mcg./ml. |
| 10 | 40,000 | 20 | 100 | 30 | 100 |
| 11 | 20,000 | 21 | 50 | 31 | 50 |
| 12 | 10,000 | 22 | 25 | 32 | 25 |
| 13 | 5,000 | 23 | 12.5 | 33 | 12.5 |
| 14 | 2,500 | 24 | 6.25 | 34 | 6.25 |
| 15 | 1,250 | 25 | 3.13 | 35 | 3.13 |
| 16 | 625 | 26 | 1.57 | 36 | 1.57 |
| 17 | 312 | 27 | 0.79 | 37 | 0.79 |

Selected ten adult persons (male and female) having normal sense of taste were demanded to mark the sample numbers which gave the sense of sweetness at the listed dilutions, and also to pick up the sample numbers which presented the sense of sweetness equivalent to No. 11 (2% solution or 20,000 mcg./ml. solution of sucrose).

Sample No. presenting minimum sense of sweetness and the number o corresponding persons

| No. 11 | (4)No. 23 | (2)No. 31 | (2)No. 34 (2) |
|---|---|---|---|
| No. 12 | (4)No. 24 | (6)No. 32 | (2) |
| No. 14 | (2)No. 25 | (2)No. 33 | (4) |

Sample No. having the sweetness equivalent to 2% sucrose solution and the number of corresponding persons

| No. 22 | (3)No. 30 | (2)No. 33 (2) |
|---|---|---|
| No. 23 | (4)No. 31 | (3) |
| No. 24 | (3)No. 32 | (3) |

When these numbers are replaced with respective concentrations and the mean values are calculated, then Sample C: 6.9 mcg./ml. or 0.0007%
Sac-Na: 21.25 mcg./ml. or 0.0021%

These concentrations first mentioned are the minimum perceivable values of sweetness. Comparing the sweetness with sucrose as the standard, the concentration of each sample corresponding to 2% sucrose solution is Sample C: 14.37 mcg./ml. or 0.0014%
Sac-Na: 47.5 mcg./ml. or 0.0048%.

When indicated by concentration, the magnitudes of sweetness have the following values:

Sample C: about 1,400 times of sucrose
Sac-Na: about 420 times of sucrose

Then it is revealed that Sample C would have sweetness about 3.5 times as much as Sac-Na has.

In summary, the results obtained with Sample C proved that, (1) The minimum concentration of solution for presenting the sense of sweetness is 0.0007%,
(2) Its intensity of sweetness is about 1,400 times of sucrose and about 3.5 times of Sac-Na, and
(3) It is utilizable as a sweetening by itself.

We claim:

1. In the process in which 4β,10α-dimethyl-1,2,3,4,5α,-10-hexahydro-6β-hydroxyfluorene is prepared from abietic acid through (a) dehydrogenation to dehydroabietic acid, (b) purification of dehydroabietic acid through sulfonation and desulfonation, (c) disproportionation to desisopropyldehydroabietic acid and desisopropylallodehydroabietic acid, (d) esterification, (e) oxidation of the resulting esters, (f) isolation of 6,7-dioxo-5α-enantiopodocarpa-8,11,13-triene-16-oate from the mixture of oxidized esters, (g) alkaline hydrolysis of the esters with enol formation, and (h) benzilic acid rearrangement, the improvements which comprise subjecting the unpurified product of the dehydrogenation reaction directly to disproportionation with aluminum chloride and, without isolation of the solid, treating the product of the disproportionation successively with thionyl chloride and methanol.

2. The process according to claim 1 including the steps of dehydrating the 4β,10α-dimethyl-1,2,3,4,5α,10-hexaydro-6β-hydroxyfluorene-4α,6α-dicarboxylic acid thereby obtained and catalytically reducing the dehydration product with palladium-on-carbon or platinum oxide to introduce one molar equivalent of hydrogen so as to yield 4β,10α-dimethyl-1,2,3,4,5β,10-hexahydrofluorene-4α,6α-dicarboxylic acid.

3. The process which comprises dehydrating the 4β-10α-dimethyl-1,2,3,4,5α,10-hexahydro-6β-hydroxyfluorene-4α,6α-dicarboxylic acid and catalytically reducing the dehydration product thereby obtained with palladium-on-carbon or platinum oxide to introduce one molar equivalent of hydrogen so as to yield 4α,10α-dimethyl-1,2,3,4,5β,10-hexahydrofluorene-4α,6α-dicarboxylic acid.

4. The process according to claim 3 wherein the dehydration is effected in a solution of acetic acid containing a small amount of sulfuric acid.

5. The process according to claim 4 wherein the catalytic reduction is effected on the reaction solution of the dehydrated product in acetic acid.

6. The process according to claim 4 wherein the catalytic reduction is effected on the dehydration product after isolation thereof from the acetic acid reaction solution.

7. A compound selected from the group consisting of (a) 4α,10α-dimethyl-1,2,3,4,5β,10-hexahydrofluorene-4α,6α-dicarboxylic acid, (b) the mono- and di-sodium, potassium or ammonium salt thereof, and (c) the calcium or aluminum salt thereof.

8. 4β,10α-dimethyl-1,2,3,4,5β,10-hexahydrofluorene-4α,6α-dicarboxylic acid having the formula:

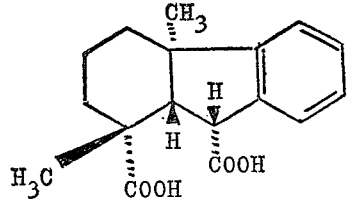

References Cited

Tahara et al. Chem. Pharm. Bull. (1970), 18(4), pp. 859–60.

JAMES A. PATTEN, Primary Examiner

U.S. Cl. X.R.

99—141 A; 260—343.3, 345.3, 448 R, 468.5, 503.5, 514.5